(12) United States Patent
Monsheimer et al.

(10) Patent No.: US 10,787,559 B2
(45) Date of Patent: Sep. 29, 2020

(54) POWDER COMPRISING POLYMER-COATED GLASS PARTICLES

(75) Inventors: Sylvia Monsheimer, Haltern am See (DE); Wolfgang Diekmann, Waltrop (DE); Franz-Erich Baumann, Duelmen (DE); Sigrid Hessel-Geldmann, Haltern am See (DE); Kristiane Warnke, Recklinghausen (DE); Heike Stemmer, Haltern am See (DE); Stefan Altkemper, Dorsten (DE)

(73) Assignee: Evonik Operations GmbH, Essen (DE)

( * ) Notice: Subject to any disclaimer, the term of this patent is extended or adjusted under 35 U.S.C. 154(b) by 2071 days.

(21) Appl. No.: 13/541,181

(22) Filed: Jul. 3, 2012

(65) Prior Publication Data

US 2013/0012643 A1 Jan. 10, 2013

(30) Foreign Application Priority Data

Jul. 6, 2011 (DE) .................... 10 2011 078 719

(51) Int. Cl.
| C08K 7/28 | (2006.01) |
| C08K 7/20 | (2006.01) |
| C08K 9/04 | (2006.01) |
| C08L 77/00 | (2006.01) |
| C08K 9/08 | (2006.01) |
| C09C 3/10 | (2006.01) |
| B29C 67/04 | (2017.01) |
| C09C 1/28 | (2006.01) |
| B29C 64/153 | (2017.01) |
| B33Y 10/00 | (2015.01) |
| B33Y 70/00 | (2020.01) |

(52) U.S. Cl.
CPC .............. C08K 9/08 (2013.01); B29C 64/153 (2017.08); B29C 67/04 (2013.01); C09C 1/28 (2013.01); C09C 3/10 (2013.01); B33Y 10/00 (2014.12); B33Y 70/00 (2014.12); C01P 2002/88 (2013.01); C01P 2004/61 (2013.01); C01P 2004/84 (2013.01); C01P 2006/12 (2013.01); Y10T 428/2996 (2015.01)

(58) Field of Classification Search
None
See application file for complete search history.

(56) References Cited

U.S. PATENT DOCUMENTS

| 4,334,056 A | 6/1982 | Meyer et al. |
| 4,687,838 A | 8/1987 | Mumcu et al. |
| 4,689,364 A | 8/1987 | Mumcu et al. |
| 5,562,978 A * | 10/1996 | Jacobson .................... 428/323 |
| 6,136,948 A | 10/2000 | Dickens, Jr. et al. |
| 6,245,281 B1 | 6/2001 | Scholten et al. |
| 7,879,938 B2 | 2/2011 | Hager et al. |
| 7,887,740 B2 | 2/2011 | Simon et al. |
| 2007/0183918 A1 | 8/2007 | Monsheimer et al. |
| 2007/0238056 A1 | 10/2007 | Baumann et al. |
| 2007/0267784 A1 | 11/2007 | Greiner |
| 2008/0124576 A1 * | 5/2008 | Elliott ........................... 428/702 |
| 2008/0132617 A1 * | 6/2008 | Eckel et al. .................. 524/127 |
| 2008/0258346 A1 * | 10/2008 | Simon et al. ................. 264/405 |
| 2009/0312454 A1 * | 12/2009 | Leuterer et al. .............. 522/164 |
| 2011/0118410 A1 | 5/2011 | Simon et al. |
| 2012/0142850 A1 * | 6/2012 | Muhlebach ........... C08F 279/02 524/567 |

FOREIGN PATENT DOCUMENTS

| CN | 101052668 A | 10/2007 |
| CN | 101054300 A | 10/2007 |
| DE | 29 06 647 | 4/1980 |
| DE | 35 10 687 | 9/1986 |
| DE | 35 10 691 | 9/1986 |
| DE | 44 21 454 | 12/1995 |
| DE | 197 47 309 | 4/1999 |
| DE | 102 27 224 | 1/2004 |
| DE | 10 2004 003 485 | 9/2004 |
| DE | 10 2004 012 682 | 10/2005 |
| DE | 10 2004 012 683 | 10/2005 |
| DE | 10 2004 020 452 | 12/2005 |
| DE | 10 2007 0 19133 | 10/2008 |
| EP | 1015214 | 7/2002 |
| EP | 1 982 816 A1 | 10/2008 |
| WO | 95/11006 | 4/1995 |
| WO | 96/06881 | 3/1996 |
| WO | 01/038061 | 5/2001 |
| WO | 2007/051691 | 5/2007 |
| WO | WO 2010/125024 | * 11/2010 |

OTHER PUBLICATIONS

Search Report dated Oct. 24, 2012 in European Application No. 12172611.1 (With English Translation of Category of Cited Documents).
U.S. Appl. No. 13/012,283, filed Jan. 24, 2011, US2011/0118410 A1, Simon, et al.

* cited by examiner

Primary Examiner — Ronak C Patel
(74) Attorney, Agent, or Firm — Oblon, McClelland, Maier & Neustadt, L.L.P.

(57) ABSTRACT

Composite particles comprising core particles completely or partially coated with a precipitated polymer, where the $d_{50}$ median diameter of the core particles is from 3 to 100 μm and wherein the glass core particle material is at least one selected from the group consisting of a solid glass bead, a hollow glass bead, a porous glass bead, and a foamed glass particle. A method to prepare the particles includes dissolution of a polymer in a solvent and precipitation of the polymer in the presence of a suspension of the core glass particles. Further provided is a layer by layer moulding process employing the composite particles and mouldings obtained therefrom.

18 Claims, No Drawings

POWDER COMPRISING POLYMER-COATED GLASS PARTICLES

CROSS REFERENCE TO RELATED APPLICATIONS

This application claims priority to German Application No. DE 102011078719.4, filed Jul. 6, 2011, the disclosure of which is incorporated herein by reference in its entirety.

BACKGROUND OF THE INVENTION

Field of the Invention

The invention relates to a powder based on polymer-coated fillers which has advantages in terms of the stability of the production process, and density, to the use of the said powder in shaping processes, and also to mouldings produced by a layer-by-layer process by which regions of a powder layer are selectively melted, with use of the said powder. After cooling and solidification of the regions previously melted layer-by-layer, the moulding can be removed from the powder bed. The mouldings according to the invention moreover exhibit less susceptibility to webpage than conventional mouldings.

Description of the Related Art

A task frequently encountered in very recent times is the rapid provision of prototypes. Particularly suitable processes are those which are based on pulverulent materials and in which the desired structures are produced layer-by-layer through selective melting and solidification. Supportive structures for overhangs and undercuts can be omitted here, because the powder bed surrounding the molten regions provides sufficient support. Nor is there any need for the subsequent operation of removing supports. The processes are also suitable for producing short runs.

The selectivity of the layer-by-layer process here can be provided by way of example by applying susceptors, absorbers, or inhibitors, or by masks, or by way of focussed introduction of energy, for example through a laser beam, or by way of glass fibres. The energy is introduced by way of electromagnetic radiation.

A process which has particularly good suitability for the purpose of rapid prototyping is selective laser sintering. In this process, plastics powders are briefly irradiated selectively in a chamber by a laser beam, and the powder particles which encounter the laser beam therefore melt. The molten particles coalesce and rapidly resolidify to give a solid mass. This process can provide simple and rapid production of three-dimensional products by repeated irradiation of a succession of freshly applied layers.

The laser sintering (rapid prototyping) process for producing mouldings from pulverulent polymers is described in detail in U.S. Pat. No. 6,136,948 and WO 96/06881. A wide variety of polymers and copolymers is claimed for the application, examples being polyacetate, polypropylene, polyethylene, ionomers and polyamide.

Other processes with good suitability are the selective inhibition bonding (SIB) processes described in WO 01/38061, and a process described in EP 1 015 214. Both processes operate with large-surface-area infrared heating for melting of the powder. The selectivity of the melting process is achieved in the first case by applying an inhibitor, and in the second process it is achieved by a mask. DE 103 11 438 describes another process. In this, the energy required for the fusion process is introduced through a microwave generator, and the selectivity is achieved by applying a susceptor.

Other suitable processes are those operating with an absorber which is either present in the powder or is applied by ink-jet processes, as described in DE 10 2004 012 682.8, DE 10 2004 012 683.6 and DE 10 2004 020 452.7.

The rapid prototyping or rapid manufacturing processes mentioned (RP or RM processes) can use pulverulent substrates, in particular polymers, preferably selected from polyesters, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or a mixture thereof.

WO 95/11006 describes a polymer powder which is suitable for the laser sintering process and which, when melting behaviour is determined by differential scanning calorimetry with a scanning rate of from 10 to 20° C./min, exhibits no overlap of the melting and recrystallization peak, has a degree of crystallinity of from 10 to 90%, likewise determined by DSC, has a number-average molecular weight Mn of from 30 000 to 500 000, and has an Mw/Mn quotient in the range from 1 to 5.

DE 197 47 309 describes the use of a nylon-12 powder which has increased melting point and increased enthalpy of fusion and which is obtained by reprecipitation of a polyamide previously produced through ring-opening and subsequent polycondensation of laurolactam. This is a nylon-12.

DE 10 2004 003 485 describes the use of particles with at least one cavity for use in processes that build layers. All of the particles described comprise at least one cavity, and the particles comprising the cavity are melted by introduction of electromagnetic energy.

In the conventional processes described above, the powders are occasionally mixed with glass beads for reinforcement. However, a disadvantage here is that the handling of powder mixtures of this type often leads to demixing phenomena, and the mechanical properties that the reinforcing material is intended to achieve therefore sometimes vary. The regions where glass bead content is excessive become very brittle and therefore unusable, and the regions comprising insufficient glass bead content are softer than intended. The demixing derives from the different density of the polymer particles and of the glass beads, and tends to be apparent to some extent during any transport of the powder mixture and during its handling. In particular if the handling of the powder is automated in the rapid manufacturing process, it is difficult to control deviations in the properties of the components produced.

In order to eliminate these disadvantages, DE 10 2007 019 133 A1 proposes a composite powder for use in a layer-by-layer process by selectively melting regions of the respective powder layer through introduction of electromagnetic energy, where the powder comprises at least one polymer powder and foamed glass particles. Here again, a mixture of polymer powder and foamed glass particles (dry-blend mixture) is involved. It has been found that foamed glass beads or foamed glass particles have low susceptibility to demixing, because density differences are small. However, poor mechanical properties are a disadvantage of the foamed glass beads or foamed glass particles, and this is equally apparent in the component.

It was an object of the present invention to provide a more effective way of eliminating the demixing phenomenon and to provide improved consistency of the mechanical properties which the reinforcing material is intended to achieve within the moulding.

SUMMARY OF THE INVENTION

This and other objects have been achieved according to the present invention, the first embodiment of which includes a powder, comprising composite particles:
wherein the composite particles, comprise:
a core glass particle having a $d_{50}$ median diameter of 3 to 100 µm; and
at least a partial coating of a polymer on the core;
wherein a ratio of the $d_{50}$ median diameter of the composite particles to the $d_{50}$ median diameter of the core glass particles is from 1.01 to 5.0, and
a melting point of the coating polymer is obtainable when the polymer is exposed to an electromagnetic energy.

In a second embodiment, the present invention provides the powder as described above wherein the core glass particle is at least one selected from the group consisting of a solid glass bead, a hollow glass bead, a porous glass bead, and a foamed glass particle, and the core glass particle is optionally sized in the composite particle.

In a preferred embodiment the present invention provides the powder according to claim 1, wherein a ratio of the $d_{50}$ median diameter of the composite particles to the $d_{50}$ median diameter of the core glass particles is from 1.05 to 5.0.

In another preferred embodiment the present invention provides the powder described above, wherein a number average weight ratio of the polymer coating to the core particle, is from 0.1 to 30.

In a particularly preferred embodiment the present invention the coating polymer is a polyamide selected from the group consisting of nylon-6,12, nylon-11 and nylon-12.

In another embodiment, a process for producing the composite particles according to is provided. The process comprises:
at least partially dissolving a polymer for the coating in a medium comprising a solvent which at least partially dissolves the polymer;
adding the core glass particles to the medium, before, during or after at least partially dissolving the polymer;
suspending the core glass particles in the medium; and then
precipitating the polymer from the at least partial solution onto the core glass particles to obtain the composite particles;
wherein a ratio of the $d_{50}$ median diameter of the composite particles to the $d_{50}$ median diameter of the core glass particles is from 1.01 to 5.0.

Throughout the following description of the invention numerical ranges and values provided include all values and subvalues therebetween as well as all intermediate ranges within the stated range values.

DETAILED DESCRIPTION OF THE PREFERRED EMBODIMENTS

The first embodiment according to the present invention, provides a powder, comprising composite particles: wherein the composite particles, comprise:
a core glass particle having a $d_{50}$ median diameter of 3 to 100 µm; and
at least a partial coating of a polymer on the core;
wherein a ratio of the $d_{50}$ median diameter of the composite particles to the $d_{50}$ median diameter of the core glass particles is from 1.01 to 5.0, and
a melting point of the coating polymer is obtainable when the polymer is exposed to an electromagnetic energy.

In a second embodiment, the present invention provides the powder as described above wherein the core glass particle is at least one selected from the group consisting of a solid glass bead, a hollow glass bead, a porous glass bead, and a foamed glass particle, and the core glass particle is optionally sized in the composite particle.

In a preferred embodiment the present invention provides the powder according to claim 1, wherein a ratio of the $d_{50}$ median diameter of the composite particles to the $d_{50}$ median diameter of the core glass particles is from 1.05 to 5.0.

In another preferred embodiment the present invention provides the powder described above, wherein a number average weight ratio of the polymer coating to the core particle, is from 0.1 to 30.

In a particularly preferred embodiment the present invention the coating polymer is a polyamide selected from the group consisting of nylon-6,12, nylon-11 and nylon-12.

In another embodiment, a process for producing the composite particles according to is provided. The process comprises:
at least partially dissolving a polymer for the coating in a medium comprising a solvent which at least partially dissolves the polymer;
adding the core glass particles to the medium, before, during or after at least partially dissolving the polymer;
suspending the core glass particles in the medium; and then
precipitating the polymer from the at least partial solution onto the core glass particles to obtain the composite particles;
wherein a ratio of the $d_{50}$ median diameter of the composite particles to the $d_{50}$ median diameter of the core glass particles is from 1.01 to 5.0.

The $d_{50}$ median diameter of the glass particles in at least in one spatial direction, is greater than 3 µm. Different dimensions are possible, depending on the spatial direction. It may be preferable that the $d_{50}$ median diameter of the glass particles in all three spatial directions is from 3 to 100 µm. The data for the diameters of the glass particles are based on the glass particles which provide the core in the composite particle to be formed.

The layer-by-layer process for producing mouldings preferably involves selective laser sintering.

Because of the firm bond between polymer and filler, the powder according to the present invention is no longer subject to the problems of demixing, and this leads to an improvement in consistency of mechanical properties in the moulding produced from the powder. Since demixing no longer occurs in the powder according to the invention, it may be possible to use the powder according to the invention in construction processes to produce uniform components and components with uniform quality. The durably uniform constitution resulting from the firm bond between polymer and core particle significantly improves the recyclability of the powder, even when a plurality of stages are involved. There may also be advantages in the use of the powders according to the invention: the powders according to the invention may be stored, transported and used in larger packaging units without any possibility of demixing. Feed quantities of the product may therefore also be greater during the laser sintering process, i.e. more powder can be charged to the sample feed container, and/or the dimensions of the sample feed container can be greater, without any resultant adverse effect on the quality of the resultant components. Furthermore, fluidization in the feed does not lead to the demixing that is relatively frequently observed in conventionally known systems. Because the powders of the present invention have an exterior shell made of polymer, the introduction of energy by the laser may also be more uniform. In conventional powders as described above, the laser sometimes encounters a polymer particle and sometimes encounters a filler particle. As a function of filler type, the result can vary in extreme cases from almost complete absorption to almost complete reflection of the energy. Powders according to the present invention advantageously avoid these problems.

Surprisingly, it has now been found that the use, as reinforcing material, of glass particles firmly bonded to polymer, i.e., the composite particle according to the present invention, in a layer-by-layer process (by selectively melting regions of the respective powder layer), may produce mouldings which have advantages in relation to susceptibility to warpage and also have properties which are better in relation to consistency of processing than mouldings made of a reinforced polymer powder according to conventionally known processes.

In one preferred embodiment, the glass particles may be selected from solid glass beads, hollow glass beads, porous glass beads, and foamed glass particles. The respective glass particles may be spherical, lamellar or of elongate form. The glass particles may optionally be sharp-edged, rounded or smooth. The glass particles may optionally be coated with sizes prior to application of the polymer in the precipitation coating. Sizes that may be used are any of the substances known to one of skill in the art, and preferably include aminosilanes, methacryloxypropyltrimethoxysilane, glycidyloxypropyltrimethoxysilane or aminopropyltriethoxysilane.

The glass of the core particles may be at least one selected from the group consisting of quartz glass, soda-lime glass, soda-lime silicate glass, float glass, lead crystal glass, borosilicate glass, E glass, A glass, E-CR glass, C glass, D glass, R glass, S glass, AR glass, enamel, chalcogenide glass 1 and chalcogenide glass 2. Particular preference may be given to E glass (for glass fibres) and float glass.

E glass is an alumino-borosilicate glass with a proportion of boron oxide of from 7 to 15% by weight and with a proportion of alkali below 2% by weight or an aluminosilicate glass, which can comprise from 0 to 10% by weight of boron oxide, and also a proportion of less than 2% by weight of alkali.

The composition of the glass used for the glass particles may preferably be $SiO_2$: 70-73% by weight; $Al_2O_3$: 1.0-2.0% by weight; $Na_2O$: 12.0-14.0% by weight; CaO: 8.0-12.0% by weight and MgO: 0-5.0% by weight.

In one preferred embodiment of the present invention, the aspect ratio (i.e. length:width ratio) of the glass particles is 20 or less, preferably 15 or less, more preferably 10 or less, still more preferably 8 or less, even more preferably 5 or less, particularly preferably 4 or less, even more particularly preferably 3 or less, with particular preference 2 or less, more preferably 1.5 or less and very particularly preferably 1.2 or less.

The coating polymer is a polymer which may be dissolved in a liquid medium comprising a solvent and which precipitates by virtue of the changes of particular parameters, e.g. temperature, pressure, content of solvent, non-solvent, anti-solvent, or precipitant, in the form of completely or partially insoluble precipitate taking the form of flakes, droplets or crystals. The type of solvent, the content of solvent and other parameters for dissolving or precipitating depend on the polymer. The person skilled in the art may use suitable experiments to determine solvents and also solution conditions and precipitation conditions.

The coating polymer may preferably be selected from the group consisting of polyolefins, polyethylene, polypropylene, polyvinylchloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide.

In another embodiment, the polymer for coating the glass particles may be obtained by co-precipitating at least one polyamide of AB type and at least one polyamide of the AABB type. Preferred co-precipitated polyamides include at least nylon-11 or nylon-12 and at least one polyamide based on PA1010, PA1012, PA1212 or PA1013.

The following precipitatable polymer and solvent combinations may be mentioned as examples. Polyolefins and polyethylene may be dissolved, for example in toluene, xylene and/or 1,2,4-trichlorobenzene. Polypropylene may be dissolved in toluene and/or xylene. Polyvinyl chloride may be dissolved in acetone. Polyacetal may be dissolved in DMF, DMAc and/or NMP. Polystyrene may be dissolved in toluene. Polyimides may be dissolved in NMP. Polysulphones may be dissolved in sulpholane. Poly(N-methylmethacrylimides) (PMMI) may be dissolved in DMAc and/or NMP. Polymethyl methacrylate (PMMA) may be dissolved in acetone. Polyvinylidene fluorides may be dissolved in N-methylpyrrolidone (NMP), dimethylformamide (DMF), dimethylacetamide (DMAc) and/or cyclohexanone. Polyether ketones and polyaryl ether ketones may be dissolved in diphenyl sulphone and/or in sulpholane. Polyamides may be dissolved in an alcoholic medium, preferably an ethanol-water mixture. As explained above, it may sometimes also necessary to adjust parameters such as temperature and pressure in order to dissolve a given polymer.

Once the relevant polymer has been dissolved, the dissolved polymer is precipitated in the presence of the core particles, in order to coat the core particles completely or partially with the relevant precipitated polymer. The precipitation of the polymer may be initiated and/or accelerated by changing the pressure, changing the temperature, changing (reducing) the concentration of the solvent, and optionally adding a non-solvent, anti-solvent and/or precipitant. In the case of amorphous polymers, such as polystyrene, sulphones, PMMI, PMMA, and ionomer, it may be necessary to add a non-solvent to precipitate the relevant polymer.

The precipitatable polymer may preferably be a polyamide which has at least 8 carbon atoms per carbonamide group. The polymer may particularly preferably be a polyamide which has 10 or more carbon atoms per carbonamide group. The polymer may very particularly preferably be a polyamide selected from nylon-6,12 (PA 612), nylon-11 (PA 11) and nylon-12 (PA 12). The production process for the polyamides that can be used in the sinter powders according to the invention is well-known and, for the production of PA 12, can be found for example, in the documents DE 29 06 647, DE 35 10 687, DE 35 10 691 and DE 44 21 454. The granulated polyamide material required may be purchased from various producers, for example, granulated nylon-12 material is available with trade name VESTAMID from Evonik Industries AG.

In a highly preferred embodiment according to the invention the coating polymer is nylon-12.

It may be moreover possible to use the corresponding copolyamides or mixtures of homo- and copolyamides which comprise at least 70 percent by weight of the units mentioned. Accordingly, they may comprise, as comonomers, from 0 to 30 percent by weight of one or more comonomers, such as caprolactam, hexamethylenediamine, 2-methyl-1,5-pentanediamine, 1,8-octamethylenediamine, dodecamethylenediamine, isophoronediamine, trimethylhexamethylenediamine, adipic acid, suberic acid, azeleic acid, sebacic acid, dodecanedioic acid, aminoundecanoic acid. The homo- and copolyamides mentioned, termed polyamides hereinafter, may be used in the form of granulated materials or ground material, where the relative solution viscosity of these is from 1.5 to 2.0 (measured in 0.5% m-cresol solution at 25° C. in accordance with DIN 53 727), preferably from 1.70 to 1.95. They may be produced by conventionally known methods, including polycondensation, or hydrolytic or acidolytic or activated anionic polymerization. It may be preferable to use unregulated polyamides having $NH_2/COOH$ end group ratios of from 40/60 to 60/40. However, it may also be advantageous to use regulated polyamides and specifically preferably those in which the $NH_2/COOH$ end group ratio is 90:10 and 80:20 or 10:90 and 20:80.

In another preferred embodiment, the $d_{50}$ median diameter of the glass particles (glass core of the composite particle) may be from 3 to 80 μm, with preference from 3 to 70 μm and more preferably from 3 to 60 μm. Optionally, the glass particles may have a median diameter of from 20 to 80 μm, with preference from 20 to 70 μm and more preferably from 20 to 60 μm. Suitable particle size distributions may be ensured through known processes, e.g. sieving or sifting. It may also be possible to carry out a post-treatment in a mixer with high shear level, preferably at temperatures above the glass transition temperature of the respective polymer, in order to round the grains and thus improve powder-flowability.

The $d_{50}$ median diameter of the composite particles may be from 20 to 150 μm, with preference from 20 to 120 μm, preferably from 20 to 100 μm, more preferably from 25 to 80 μm and particularly preferably from 25 to 70 μm.

The ratio by weight of the coating polymer to the glass particles, based on the entirety of the composite particles may be from 0.1 to 30, preferably from 1.0 to 10.0 and more preferably from 1.4 to 5.0. The density of the glass particles and the polymer coating must be considered when determining the weight ratio.

In one preferred embodiment, the density of the glass particles may be from 0.1 to 6.6 g/cm$^3$, preferably from 2.0 to 6.6 g/cm$^3$, more preferably from 2.0 to 3.5 g/cm$^3$, particularly preferably from 2.1 to 2.7 g/cm$^3$ and most preferably from 2.2 to 2.6 g/cm$^3$. Foamed glass has a substantially lower density. The density of foamed glass particles is from 0.1-0.4 g/cm$^3$. The density of polyamide is about 1.08 to 1.24 g/cm$^3$.

The ratio of the $d_{50}$ median diameter of the composite particles to the $d_{50}$ median diameter of the glass particles may be from 1.01 to 5.0, preferably from 1.05 to 5.0. Composite particles having distinct core-shell structure are preferred: the ratio of the $d_{50}$ median diameter of the composite particles to the $d_{50}$ median diameter of the glass particles may therefore be from 1.1 to 5.0, with preference from 1.15 to 5.0, particularly preferably from 1.2 to 5.0, more preferably from 1.4 to 5.0, particularly preferably from 1.5 to 5.0, still more preferably from 1.8 to 5.0, and very particularly preferably from 2.0 to 5.0.

In another preferred embodiment, the density of the core particles is greater than the density of the solvent or not more than 20%, with preference not more than 15%, more preferably not more than 10% and particularly preferably not more than 5% less than the density of the solvent used for the precipitation of the polymer.

During the precipitation of the polymer in the presence of the glass particles it may be particularly preferable to use, as solvent, an alkanol (for example: methanol, ethanol, propanol, or butanol), preferably ethanol, where the density of the glass particles is greater than or not more than 20%, with preference not more than 15%, more preferably not more than 10% and particularly preferably not more than 5%, smaller than the density of the alkanol, preferably ethanol.

The powder may comprise the composite particles alone or may be admixed in uncompacted form with dry-blend fillers and/or auxiliaries. The proportion of the composite particles in the powder may be at least 50% by weight, with preference to at least 80% by weight, preferably at least 90% by weight, particularly preferably at least 95% by weight and very particularly preferably at least 99% by weight.

The powders according to the invention may optionally comprise auxiliaries and/or other organic or inorganic pigments. These auxiliaries may include powder-flow aids, e.g. precipitated and/or fumed silicas. Precipitated silicas are available under the product name AEROSIL®, with various specifications from Evonik Industries AG. It may be preferable that the powder according to the invention comprises less than 3% by weight of these auxiliaries, with preference from 0.001 to 2% by weight and very particularly preferably from 0.05 to 1% by weight, based on the entirety of the polymers present. The pigments can by way of example be titanium dioxide particles based on rutile (preferably) or anatase or carbon black particles.

In order to improve processability or for further modification of the powder according to the invention, inorganic foreign pigments, e.g. transition metal oxides, stabilizers, e.g. phenols, in particular sterically hindered phenols, flow aids or powder-flow aids, e.g. fumed silicas, can be added thereto. The amount of the said substances added to the polymers based on the total weight of polymers in the polymer powder is preferably such as to provide compliance with the concentrations stated for auxiliaries for the powder according to the invention.

The properties of a precipitated powder according to the present invention may achieved when the melting point of the polymeric component during the first heating procedure is higher by at least 3% than during the second heating procedure, when measured by differential scanning calorimetry (DSC); and when the enthalpy of fusion of the polymeric component during the first heating procedure is at least 50% higher than during the second heating procedure, when measured by a differential scanning calorimetry (DSC).

More ideal properties in the further processing of the powder may be achieved when the melting point of the polymeric component in the first heating procedure is from 3 to 7% higher than during the second heating procedure, when measured by differential scanning calorimetry (DSC); and when the enthalpy of fusion of the polymeric component during the first heating procedure is at least 50% greater than during the second heating procedure, when measured by a differential scanning calorimetry (DSC).

A nylon-12 which may be particularly suitable for the laser sintering process has a melting point of from 185 to 189° C., with preference from 186 to 188° C., an enthalpy of fusion of 112+/−17 kJ/mol, with preference from 100 to 125 kJ/mol and a freezing point of from 138 to 143° C., with preference from 140 to 142° C.

The invention also provides a process for producing the abovementioned powder, which comprises: at least partially dissolving a polymer for the coating in a medium comprising a solvent which at least partially dissolves the polymer; adding the core glass particles to the medium, before, during or after at least partially dissolving the polymer; suspending the core glass particles in the medium; and then precipitating the polymer from the at least partial solution onto the core glass particles to obtain the composite particles; wherein a ratio of the $d_{50}$ median diameter of the composite particles to the $d_{50}$ median diameter of the core glass particles is from 1.01 to 5.0.

In order to produce an at least partial solution, the coating polymer may be brought into contact, in the presence of glass particles, with exposure to pressure and/or heat, with a medium comprising solvent which dissolves the polymer, and then the polymer is precipitated from the at least partial solution, and composite particles are obtained which are provided by glass particles coated entirely or partially with the precipitated polymer, where the $d_{50}$ median diameter of the glass particles is from 3 to 100 µm.

An advantage of the process according to the invention may be provided in that an operation is saved during the production of the powder, because there is no longer any need for the dry-blend mixing of polymer particles and auxiliary particles and/or filler particles.

In one preferred process, the glass particles may be selected from the group consisting of solid glass beads, hollow glass beads, porous glass beads, foamed glass particles and glass fibres. The respective glass particles may be spherical, lamellar, or elongate and optionally, the glass particles may be sharp-edged, rounded-off or smooth. The glass particles may optionally be coated with sizes prior to application of the polymer coating by precipitation.

The aspect ratio (i.e. length:width ratio) of the glass particles used in the process may be 20 or less, preferably 15 or less, more preferably 10 or less, still more preferably 8 or less, even more preferably 5 or less, particularly preferably 4 or less, even more particularly preferably 3 or less, with particular preference 2 or less, more preferably 1.5 or less and very particularly preferably 1.2 or less.

The precipitatable polymer may be selected from the group consisting of polyolefins, polyethylene, polypropylene, polyvinylchloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide, AABB polyamides and mixtures thereof, in particular mixtures of homo- and copolyamide. In another preferred embodiment, AABB polyamides may be used in pure form without mixing with any other polymer.

In another embodiment, the polymer for coating the glass particles may be obtained through precipitation of at least one polyamide of AABB type or through precipitation, together, of at least one polyamide of AB type and of at least one polyamide of AABB type. Preference may be given to co-precipitated polyamides, where at least nylon-11 or nylon-12 and at least one polyamide based on PA1010, PA1012, PA1212 or PA1013 is present.

The nature of the solvent and the content of solvent, and also the other parameters for dissolving and in turn precipitating the corresponding polymer depend on the polymer and may be determined as described above.

The following paragraphs are directed to polymers which may be dissolved in the alcoholic medium, in particular polyamides. The coating of glass particles with polymers for which other solvents are used, or must be used, requires appropriate modification of the parameters and solvents as known to one of ordinary skill in the art.

A feature of a preferred embodiment of the process of the invention is that a suspension is used which is obtainable by suspending the inorganic core particles in the medium comprising a solvent which dissolves the polymer, for example an alcoholic medium, with introduction of energy input greater than 1000 kJ/m³. This generally already produces very useful suspensions of the core particles in the medium. The energy input mentioned may be achieved through known assemblies. Suitable assemblies include, but are not limited to, planetary-gear kneaders, rotor-stator machinery, an agitated ball mill, a roll mill or the like.

The suspensions that are useful for the invention are produced in a medium comprising solvents which dissolve the precipitatable polymer, for example an alcoholic medium. In the case of an alcoholic medium, the solvent may be a pure alcohol, a mixture of a plurality of alcohols, or alcohols with a content of water or of other substances which do not in essence have any disadvantageous effect on the desired reprecipitation of the polyamides. The alcoholic medium of the suspensions preferably has less than 50% by weight content of non-alcoholic substances (preferably water), particularly preferably comprising less than 30% by weight, and particularly advantageously less than 10% by weight, of foreign non-alcoholic substances. The invention may optionally use any of the types of alcohols or mixtures thereof which permit reprecipitation of polymers, preferably polyamides, under the desired conditions (pressure and temperature). In any particular case, it is relatively easy for the person skilled in the art to modify the system to meet specific requirements. The process of the invention may preferably use as alcoholic medium for the precipitation of the polyamide and/or the suspension of the core particles, one or more alcohols which have a numeric ratio of oxygen atoms to carbon atoms in the range from 1:1 to 1:5.

Suitable alcohols for producing the suspension of the core particles may be those where the ratio of oxygen to carbon is 1:1, 1:2, 1:3, 1:4 or 1:5, preferably those where the ratio of oxygen to carbon is 1:2 or 1:3, particularly preferably where the oxygen to carbon ratio is 1:2. It is very particularly advantageous to use ethanol for producing a suspension of the core particles, and also for the reprecipitation of the precipitatable polymer, preferably of the polyamides.

As previously explained, the precipitatable polymer may preferably be selected from the group consisting of polyolefins, polyethylene, polypropylene, polyvinyl chloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide. The precipitatable polyamide is dissolved in an appropriate solvent so that it can be reprecipitated on the surface of the glass particles for coating the same.

Polymers precipitated to form the coating preferably include polyamides and preferably the polyamide has at least 8 carbon atoms per carbonamide group. It may be particularly preferable that the polymer is a polyamide which has 10 or more carbon atoms per carbonamide group. Polyamides which may preferably be used as starting material for the process of the invention comprise inter alia nylon-11, nylon-12 and polyamides having more than 12 aliphatically bonded carbon atoms per carbonamide group, preferably nylon-12. It may be optionally possible to use the corresponding copolyamides or a mixture of homo- and copolyamides where these comprise at least 70 percent by weight of the coating polymer. From 0 to 30 percent by weight may be due to one or more comonomers, such as caprolactam, hexamethylenediamine, 2-methyl-1,5-pentanediamine, 1,8-octamethylenediamine, dodecamethylenediamine, isophoronediamine, trimethylhexamethylenediamine, adipic acid, suberic acid, azelaic acid, sebacic acid, dodecanedioic acid or aminoundecanoic acid. The homo- and copolyamides, termed polyamides hereinafter may be used in the form of granulated materials or ground material, where the relative solution viscosity measured in 0.5% m-cresol solution at 25° C. in accordance with DIN 53 727 is from 1.5 to 2.3, preferably from 1.7 to 1.95. These polymers may be produced by polycondensation, or hydrolytic or acidolytic or activated anionic polymerization, by known processes. It may be preferable to use unregulated polyamides with $NH_2$/COOH end group ratios of from 40/60 to 60/40. The polyamide used may comprise at most 0.2 percent by weight of $H_3PO_4$, however, use of $H_3PO_4$-free polyamide may be preferred. Alternatively, regulated polyamides and specifically preferably those in which the $NH_2$/COOH end group ratio is 90:10 and 80:20 or 10:90 and 20:80 may be employed.

Any of methods known to one of skill in the art may be used to produce the solution of the precipitatable polymers, preferably the polyamides, for the reprecipitation process. It may be advantageous to achieve maximum completeness of dissolution of the precipitatable polymers, preferably of the polyamide, in the appropriate medium, preferably an alcoholic medium, in the presence of the core particles suspended therein. Dissolution may be promoted by use of pressure and/or heat. In an advantageous procedure, the precipitatable polymer, may initially be present in the alcoholic medium and may be dissolved with exposure to elevated temperature for the required time. The suspension of the core particles may be added prior to, during or after the dissolution of the precipitatable polymer. The suspension of the core particles may advantageously be present together with the precipitatable polymer, in the starting mixture. The dissolution procedure may advantageously be assisted by the use of appropriate agitation assemblies. The precipitation of the precipitatable polymer may be assisted by using pressure and/or heat, preferably using a temperature reduction and/or removal of the solvent, by distillation (preferably under reduced pressure) to precipitate the precipitatable polymer. However, it may also be possible to assist the precipitation process by adding an anti-solvent (precipitant).

In an optionally preferred process, after formation of the composite particles, a post-treatment may be carried out in a mixer with high shear. The temperature here may particularly preferably be above the glass transition temperature of the respective polymer. This measure may serve to round the grains and improve powder-flowability.

The abovementioned parameters are determined as follows:

BET surface area was determined in accordance with DIN ISO 9277: 2003-05 with gas-adsorption equipment from Micromeritics for determining specific surface area by the BET method (Micromeritics TriStar 3000 V6.03: V6.03 refers to the software version of the Win3000 Software). BET surface area was determined by means of nitrogen gas adsorption by the discontinuous volumetric method (DIN ISO 9277:2003-05, Section 6.3.1.). For this, a number (seven) of measurement points were determined at relative pressures P/P0 from 0.05 to 0.20. He (purity at least 4.6 [99.996%] according to operating instructions, or at least 4.0 [99.99%] according to standard; this also applies to $N_2$) was used for dead volume calibration. The samples were devolatilized respectively for 1 hour at room temperature (21° C.) and 16 hours at 80° C. in vacuo. The specific surface area was based on the devolatilized specimen. The evaluation used multipoint determination (DIN ISO 9277:2003-05, Section 7.2). The temperature during the measurement was 77 K.

The particle size ($d_{50}$ fineness) was determined by means of laser scattering. The measurements were carried out with a Malvern Mastersizer 2000. A dry measurement is involved here. For the measurement, in each case from 20 to 40 g of powder were metered into the system with the aid of Scirocco dry-dispersion equipment. The feed rate used to operate the vibrating trough was 70%. The pressure of the dispersion air was 3 bar. Each measurement involved a background measurement (10 seconds/10 000 individual measurements). The measurement time for the sample was 5 seconds (5000 individual measurements). The refractive index, and also the blue-light value, was defined as 1.52. Evaluation was based on the Mie theory.

Bulk density is calculated in accordance with DIN EN ISO 60.

Particle content is determined by ash/ignition residue determination in accordance with DIN EN ISO 3451 Part 1 and Part 4.

Solution viscosity was determined in 0.5% meta-cresol solution in accordance with ISO 307.

In another embodiment, the present invention includes a process for producing a moulded article, comprising:

applying a layer of the composite powder according to the present invention;

selectively melting at least one region of the layer by introduction of electromagnetic energy;

allowing the melted region to solidify;

applying another layer of composite powder and repeating the melting and solidification to perform a layer-by-layer process in which a moulding having a structure according to the selective treatment is obtained;

wherein the melting selectivity is achieved by applying susceptors, inhibitors, or absorbers to each applied layer or by applying a mask to the applied layer.

By selectively melting regions of the respective powder layer through the introduction of electromagnetic energy, where the selectivity is achieved by applying susceptors, inhibitors or absorbers or by masks, where at least one powder is used which comprises composite particles coated entirely or partially with a precipitated polymer, where the $d_{50}$ median diameter of the glass particles is from 3 to 100 µm.

The present invention also provides mouldings obtained from the powders according to the invention by the abovementioned process. The moulding thus produced may comprise a polymer or polymers preferably selected from the group consisting of polyolefins, polyethylene, polypropylene, polyvinylchloride, polyacetal, polystyrene, polyimides, polysulphones, poly(N-methylmethacrylimides) (PMMI), polymethyl methacrylate (PMMA), polyvinylidene fluorides (PVDF), ionomer, polyether ketones, polyaryl ether ketones, polyamide, copolyamide and mixtures thereof, in particular mixtures of homo- and copolyamide. In another embodiment, the polymer may be a polyamide of AABB type or a mixture of at least one polyamide of AB type and at least one polyamide of AABB type. Preference is given here to mixtures of polyamides where at least nylon-11 or nylon-12 and at least one polyamide based on PA1010, PA1012, PA1212 or PA1013 is present.

Advantages of the said process with use of the powder according to the invention arise in that the powder no longer demixes, fewer cavities arise in the component, and also from better recyclability, and the uniform quality and more uniform mechanical properties of the components, and also in that there is sharp separation between molten and non-molten regions, and in that the components have low warpage.

The energy may be introduced through electromagnetic radiation, and the selectivity may be introduced by masks, or application of inhibitors, absorbers or susceptors, or else by focussing of the radiation, for example by lasers. The electromagnetic radiation comprises the range from 100 nm to 10 cm, preferably from 400 nm to 10 600 nm or from 800 to 1060 nm. The source of the radiation may alternatively be a microwave generator, a suitable laser, a fibre laser, a radiant heat source or a lamp, or else a combination thereof. After cooling of all of the layers, the moulding may be removed.

The following examples of processes of this type serve for illustration, but there is no intention that the invention be restricted thereto.

Laser sintering processes are based on the selective sintering of polymer particles, where layers of polymer particles are briefly exposed to laser light and the polymer particles exposed to the laser light bond to one another. The successive sintering of layers of polymer particles produces three-dimensional objects. Details concerning the selective laser sintering process may be found in U.S. Pat. No. 6,136,948 and WO 96/06881.

Other processes which may be suitability employed include the SIB processes described in WO 01/38061, and the process described in EP 1 015 214. Both processes operate with large-surface-area infrared heating for melting of the powder.

The selectivity of the melting process is achieved in the first case by applying an inhibitor, and in the second process it is achieved by a mask. DE 103 11 438 describes another process in which the energy required for the fusion process is introduced through a microwave generator, and the selectivity is achieved by applying a susceptor.

Other suitable processes are those operating with an absorber which is either present in the powder or is applied by ink jet processes, as described in DE 10 2004 012 682.8, DE 10 2004 012 683.6 and DE 10 2004 020 452.7.

A feature of the mouldings according to the present invention which are produced by a layer-by-layer process in which regions are selectively melted is that the density of the moulding component may be reduced in comparison to a component produced from conventionally known powder as described above. Susceptibility to warpage is moreover reduced, and an improvement is achieved in the reproducibility of mechanical properties in the moulding.

The mouldings may moreover comprise auxiliaries as described as optional components for the powder, e.g. heat stabilizers, e.g. sterically hindered phenol derivatives. The mouldings preferably comprise less than 3% by weight of these auxiliaries, based on the entirety of the polymers present, particularly preferably from 0.001 to 2% by weight and very particularly preferably from 0.05 to 1% by weight.

Application sectors for the said mouldings may be found both in rapid prototyping and in rapid manufacturing. The latter certainly also means small runs, i.e. the production of more than one identical part, where however production by means of an injection mould is not economic. Examples include parts for high specification cars of which only small numbers of units are produced, or replacement parts for motorsport, where availability time is important, as well as the small numbers of units. Sectors in which the parts are used include but are not limited to the aerospace industry, medical technology, mechanical engineering, automobile construction, the sports industry, the household goods industry, the electrical industry, and the lifestyle sector.

The invention also provides the use of the powder according to the invention in a process for producing mouldings by a layer-by-layer process in which regions of the respective powder layer are selectively melted through introduction of electromagnetic energy, where the selectivity is achieved by applying susceptors, inhibitors, or absorbers or by masks, where at least one powder is used which comprises composite particles which are coated entirely or partially with a precipitated polymer, where the $d_{50}$ median diameter of the glass particles is from 3 to 100 μm.

Having generally described this invention, a further understanding can be obtained by reference to certain specific examples which are provided herein for purposes of illustration only and are not intended to be limiting unless otherwise specified.

The values measured for bulk density were determined by an apparatus in accordance with DIN EN ISO 60.

EXAMPLES

Example 1

Reprecipitation of Nylon-12 (PA 12) (not According to the Invention)

400 kg of unregulated PA 12 produced by hydrolytic polymerization and having a relative solution viscosity of 1.62 and 75 mmol/kg of COOH end group content and 69 mmol/kg of $NH_2$ end group content were heated to 145° C. with 2500 l of ethanol denatured with 2-butanone and 1% water content, within a period of 5 hours in a 3 $m^3$ stirred tank (a=160 cm) and held at the said temperature for 1 hour, with stirring (blade stirrer, x=80 cm, rotation rate=49 rpm). The jacket temperature was then reduced to 124° C. and the internal temperature was brought to 125° C. at the same stirrer rotation rate with continuous removal of the ethanol by distillation, with a cooling rate of 25 K/h. From this juncture onwards, with the same cooling rate, the jacket temperature was held at from 2K to 3K below the internal temperature. The internal temperature was brought to 117° C., with the same cooling rate, and was then held constant for 60 minutes. Material was then removed by distillation with a cooling rate of 40 K/h, and the internal temperature was thus brought to 111° C. At the said temperature, the precipitation process began, discernible from the evolution of heat. The distillation rate was increased in such a way that the internal temperature did not rise beyond 111.3° C. After 25 minutes, the internal temperature fell, indicating the end of the precipitation process. The temperature of the suspension was brought to 45° C. by further removal of material by distillation and cooling by way of the jacket, and then the suspension was transferred to a paddle dryer. The ethanol was removed by distillation at 70° C./400 mbar, and the residue was then further dried for 3 hours at 20 mbar/86° C.

This gave a precipitated PA 12 with an average diameter of 55 μm. Bulk density was 435 g/l.

By analogy with the procedure indicated in Example 1 or in accordance with DE 19708146 a powder was produced with glass particles as core and a shell made of PA12, PA6.13, PA12/10.13, PA12/10.12, PA10.12, PA10.10, PA6.12, PA10.13, PA6.18, or PA12.18.

Example 2

Single-Stage Reprecipitation of PA12 with Glass Particles (According to the Invention)

As in Example 1, from 250 to 375 kg of a PA12 produced by hydrolytic polymerization with relative solution viscosity ($\eta_{rel}$) 1.62 and with 75 mmol/kg of COOH end group content, and 66 mmol/kg of NH$_2$ end group content were reprecipitated in the presence of from 162.5 to 250 kg of glass particles with the properties set out in Table 1. Table 2 collates the results and parameters.

TABLE 1

Properties of the various glass particles used in Examples 2 to 5:

| Glass particles | d$_{50}$ |
|---|---|
| Glass powder | 20 µm |
| HGB (hollow glass beads) | 17 µm |
| Poraver HGB | 40-60 µm |
| Glass beads, c40-80 | 40-80 µm |
| Glass beads, type 6 | 5-6 µm |
| Glass beads, type 1 | 30-45 µm |
| Glass beads, type 1 < 63 µm | <63 µm |
| Glass beads, type 1 30-50 µm | 30-50 µm |
| Glass beads, type 1 up to 30 µm | up to 30 µm |
| Swarcoforce glass beads, coated and uncoated * | 40-80 µm |
| MF 7982 glass fibres | 14 µm; length: 210 µm |
| MF 7980 glass fibres | 14 µm; length: 190 µm |

* the description "coated" and, respectively, "uncoated" relates not to the precipitated polymer but to a particular type of impregnation of the glass particles.

In this example, the precipitation conditions were modified in the following way in comparison with Example 1:

Precipitation temperature: 108° C.
Precipitation time: 150 min
Agitator rotation rate: from 40 to 77 rpm Table 2 collates the characterization (bulk density, diameter and BET surface area) of the powders produced in accordance with Example 2. Table 2 also gives the amounts used of polyamide, glass particles and ethanol, and the agitator rotational rate used during the process.

TABLE 2

Characterization of the powders produced in accordance with Example 2

| ARR rpm | BD g/L | d$_{50}$ µm | BET m$^2$/g | EtOH L | PA kg | Glass particles kg |
|---|---|---|---|---|---|---|
| \multicolumn{7}{Glass powder in PA12} |
| 40 | 370-380 | 42 | 7.4-9.5 | 2500 | 375 | 206 |
| 40 | 310-320 | 46-53 | 10.6-9.9 | 2500 | 375 | 162.5 |
| 52 | 350-380 | 35 | 8-5.4 | 2500 | 348 | 232 |
| 65 | 400 | 35 | 4.6 | 2500 | 348 | 232 |
| \multicolumn{7}{HGB in PA12} |
| 40 | 246-378 | 39 | 12.8-11.4 | 2500 | 375 | 93.75 |
| 40 | 250 | 29 | 7.7 | 2500 | 348 | 150 |
| 40 | 243 | 24 | 9.1 | 2500 | 348 | 232 |
| 40 | 270 | 33 | 6.7 | 2500 | 348 | 116 |
| \multicolumn{7}{Poraver HGB in PA12} |
| 39 | 421 | 79 | 3.6 | 2500 | 348 | 232 |
| \multicolumn{7}{Glass beads, c40-80 in PA12} |
| 66 | 424 | 76.1 | 10 | 2500 | 375 | 161 |
| 66 | 479 | 87 | 7.6 | 2500 | 250 | 167 |
| 66 | 549 | 93 | 6.9 | 2500 | 250 | 250 |
| \multicolumn{7}{Glass beads, type 6 in PA12} |
| 77 | 404 | 27.3 | 6.4 | 2500 | 250 | 157 |
| \multicolumn{7}{Glass beads, type 1 <63 µm in PA12} |
| 39 | 442 | 84 | 4.8 | 2500 | 348 | 150 |
| 39 | 446 | 71 | 5 | 2500 | 348 | 232 |
| 39 | 455 | 60 | 4.4 | 2500 | 239 | 239 |
| 39 | 489 | 52 | 3.2 | 2500 | 195.5 | 293.5 |
| 39 | 531 | 41 | 2.6 | 2500 | 130 | 305 |
| 39 | 631 | 59 | 2.2 | 2500 | 78 | 313 |
| 39 | 641 | 39 | 1.9 | 2500 | 78 | 313 |
| 39 | 805 | 37 | 1.1 | 2500 | 35 | 313 |
| \multicolumn{7}{Glass beads, type 1, 0-30 µm in PA12} |
| 39 | 425 | 51 | 4.1 | 2500 | 348 | 232 |
| \multicolumn{7}{Glass beads, type 1 <30-50 µm in PA12} |
| 44 | 486 | 63.8 | 4.7 | 2500 | 313 | 213 |
| 44 | 499 | 63.7 | 4.2 | 2500 | 313 | 213 |
| 44 | 471 | 64 | 5.1 | 2500 | 313 | 213 |
| 44 | 474 | 64 | 5.1 | 2500 | 313 | 213 |
| 39 | 495 | 83 | 4.1 | 2500 | 348 | 232 |
| 39 | 538 | 44 | 2.5 | 2500 | 130 | 305 |
| 39 | 638 | 38 | 1.7 | 2500 | 78 | 313 |
| 39 | 535 | 40 | 2.2 | 2500 | 130 | 305 |
| 39 | 626 | 40 | 1.9 | 2500 | 78 | 313 |
| \multicolumn{7}{Glass fibres MF 7982 in PA12} |
| 53 | 337 | 67 | 11.8 | 2500 | 375 | 100 |
| 53 | 325 | 67.3 | 14.2 | 2500 | 375 | 163 |
| 65 | 318 | 72 | 10 | 2500 | 348 | 232 |
| 39 | 327 | 71 | 6.5 | 2500 | 348 | 232 |
| \multicolumn{7}{Glass fibres MF 7980 in PA12} |
| 53 | 355 | 75 | 7.1 | 2500 | 375 | 94 |
| 53 | 352 | 74.7 | 7.5 | 2500 | 375 | 94 |
| 53 | 392 | 70 | 4.8 | 2500 | 375 | 44 |
| 53 | 382 | 77.5 | 7.7 | 2500 | 375 | 44 |
| \multicolumn{7}{Swarcoforce 40-80 (uncoated*) glass beads in PA12} |
| 39 | 392 | 89 | 5.9 | 2500 | 348 | 150 |
| 39 | 494 | 110 | 4.1 | 2500 | 348 | 232 |
| 39 | 540 | 108 | 4.1 | 2500 | 348 | 348 |
| \multicolumn{7}{Swarcoforce 40-80 (c3 coated*) glass beads in PA12} |
| 39 | 441 | 110 | 4.5 | 2500 | 348 | 150 |
| 39 | 474 | 109 | 4.7 | 2500 | 348 | 232 |
| 39 | 530 | 109 | 5.2 | 2500 | 348 | 348 |

ARR = Agitation rotation rate;
BD = bulk density
*the description "coated" and, respectively, "uncoated" relates not to the precipitated polymer but to a particular type of impregnation of the glass particles. The size for the Swarcoforce product used is c-aminopropyltriethoxysilane.

Example 3

Single-Stage Reprecipitation of PA6.13 with Glass Particles (According to the Invention)

As in Example 1, from 228 to 292 kg of a PA6.13 produced by hydrolytic polymerization with relative solution viscosity ($\eta_{rel}$) 1.81 and with 11 mmol/kg of COOH end group content, and 89 mmol/kg of NH$_2$ end group content were reprecipitated in the presence of from 40 to 157 kg of glass particles with the properties set out in Table 1.

In this example, the precipitation conditions were modified in the following way in comparison with Example 1:

Precipitation temperature: 121° C.

Precipitation time: 150 min

Agitator rotation rate: 52-53 rpm

Table 3 collates the characterization (bulk density, diameter and BET surface area) of the powders produced in accordance with Example 3. Table 3 also gives the amounts used of polyamide, glass particles and ethanol, and the agitator rotational rate used during the process.

TABLE 3

Characterization of the powders produced in accordance with Example 3

| ARR rpm | BD g/L | $d_{50}$ μm | BET $m^2/g$ | EtOH L | PA kg | Glass particles kg |
|---|---|---|---|---|---|---|
| Quartz glass powder in PA6.13 | | | | | | |
| 53 | 349 | 62 | 13.9 | 2500 | 292 | 125 |
| 52 | 401 | 56 | 5.2 | 2500 | 228 | 99 |
| 52 | 405 | 54 | 5.8 | 2500 | 228 | 123 |
| HGB in PA6.13 | | | | | | |
| 52 | 341 | 60 | 4.3 | 2500 | 228 | 40 |
| 52 | 327 | 53 | 4.1 | 2500 | 228 | 57 |
| Glass beads, type 1 <63 μm in PA6.13 | | | | | | |
| 53 | 436 | 59 | 3.4 | 2500 | 292 | 157 |
| Glass beads, type 1 <63 μm and quartz glass powder in PA6.13 | | | | | | |
| 53 | 438 | 64 | 5.0 | 2500 | 292 | 62.5/62.5 |

ARR = Agitation rotation rate;
BD = bulk density

Example 4

Single-Stage Reprecipitation of PA12/13 with Glass Particles (According to the Invention)

As in Example 1, from 39 to 156 kg of a PA12 produced by hydrolytic polymerization with relative solution viscosity ($\eta_{rel}$) 1.87 and with 2 mmol/kg of COOH end group content, and 79 mmol/kg of $NH_2$ end group content, and from 39 to 152 kg of a PA10.13 produced by hydrolytic polymerization with relative solution viscosity ($\eta_{rel}$) 1.82 and with 10 mmol/kg of COOH end group content, and 119 mmol/kg of $NH_2$ end group content were reprecipitated in the presence of from 213 to 313 kg of glass particles with the properties set out in Table 1.

In this example, the precipitation conditions were modified in the following way in comparison with Example 1:

Precipitation temperature: 102° C.

Precipitation time: 150 min

Agitator rotation rate: 39 rpm

Table 4 collates the characterization (bulk density, diameter and BET surface area) of the powders produced in accordance with Example 4. Table 4 also gives the amounts used of polyamide, glass particles and ethanol, and the agitator rotational rate used during the process.

TABLE 4

Characterization of the powders produced in accordance with Example 4

| ARR rpm | BD g/L | $d_{50}$ μm | BET $m^2/g$ | EtOH L | PA kg | Glass particles kg |
|---|---|---|---|---|---|---|
| Glass beads, type 1, 30-50 μm in PA12/10.13 | | | | | | |
| 39 | 654 | 72 | 2.9 | 2500 | 65/65 | 313 |
| 39 | 724 | 51 | 4.5 | 2500 | 39/39 | 305 |
| Glass beads, type 1, <63 μm in PA12/10.13 | | | | | | |
| 66 | 554-533 | 60-62.7 | 4.1-7.9 | 2500 | 156/156 | 213 |

ARR = Agitation rotation rate;
BD = bulk density

Example 5

Single-Stage Reprecipitation of PA12/10.12 with Glass Particles (According to the Invention)

As in Example 1, from 286 to 313 kg of a PA12/10.12 produced by hydrolytic polymerization with relative solution viscosity ($\eta_{rel}$) 1.82 and with 71 mmol/kg of COOH end group content, and 35 mmol/kg of $NH_2$ end group content were reprecipitated in the presence of from 154 to 234 kg of glass particles with the properties set out in Table 1.

In this example, the precipitation conditions were modified in the following way in comparison with Example 1:

Precipitation temperature: 103° C.

Precipitation time: 135-145 min

Agitator rotation rate: from 39 to 53 rpm

Table 5 collates the characterization (bulk density, diameter and BET surface area) of the powders produced in accordance with Example 5. Table 5 also gives the amounts used of polyamide, glass particles and ethanol, and the agitator rotational rate used during the process.

TABLE 5

Characterization of the powders produced in accordance with Example 5

| ARR rpm | BD g/L | $d_{50}$ μm | BET $m^2/g$ | EtOH L | PA kg | Glass particles kg |
|---|---|---|---|---|---|---|
| Glass beads, type 1, <63 μm in PA12/10.12 | | | | | | |
| 53 | 477 | 46.8 | 2.9 | 2500 | 313 | 213 |
| 39 | 503 | 118 | | 2500 | 286 | 154 |
| 39 | 501 | 107 | 3.3 | 2500 | 286 | 190 |
| 39 | 517 | 99 | 2.9 | 2500 | 286 | 234 |

ARR = Agitation rotation rate;
BD = bulk density

The invention claimed is:

1. A powder, comprising composite particles:
   wherein the composite particles, comprise:
      a core glass particle having a $d_{50}$ median diameter of 3 to 100 μm; and
      at least a partial coating of a polymer on the core;
   wherein a ratio of the $d_{50}$ median diameter of the composite particles to the $d_{50}$ median diameter of the core glass particles is from 1.01 to 5.0, and
   wherein a number average weight ratio of the polymer coating to the core glass particle, is from 1 to 30.

2. The powder according to claim 1, wherein
the core glass particle is at least one selected from the group consisting of a solid glass bead, a hollow glass bead, a porous glass bead, and a foamed glass particle, and
the core glass particle is optionally sized in the composite particle.

3. The powder according to claim 2, wherein the $d_{50}$ median diameter of the core glass particles is from 3 to 80 µm.

4. The powder according to claim 1, wherein the polymer of the coating comprises at least one polymer selected from the group consisting of a polyolefin, a polyethylene, a polypropylene, a polyvinyl chloride, a polyacetal, a polystyrene, a polyimide, a polysulphone, a poly(N-methylmethacrylimide) (PMMI), a polymethyl methacrylate (PMMA), a polyvinylidene fluoride (PVDF), an ionomer, a polyether ketone, a polyaryl ether ketone, a polyamide, and a copolyamide.

5. The powder according to claim 1, wherein a $d_{50}$ median diameter of the composite particles is from 20 to 150 µm.

6. The powder according to claim 1, wherein a ratio of the $d_{50}$ median diameter of the composite particles to the $d_{50}$ median diameter of the core glass particles is from 1.05 to 5.0.

7. The powder according to claim 1, wherein an aspect ratio of the core glass particle is 20 or less.

8. The powder according to claim 1, wherein a density of the core glass particles is from 0.1 to 6.6 g/cm$^3$.

9. The powder according to claim 1, wherein the coating polymer is a polyamicle having at least 8 carbons per carbonamide group.

10. The powder according to claim 9, wherein the polyamide is at least one selected from the group consisting of nylon-6,12, nylon-11 and nylon-12.

11. The powder according to claim 1, which further comprises at least one selected from the group consisting of a powder-flow aid, an organic pigment, an inorganic pigment, and a sterically hindered phenol.

12. The powder according to claim 11, wherein a content of the composite particles in the powder is at least 50% by weight.

13. The powder according to claim 1, wherein the number average weight ratio of the polymer coating to the core glass particle, is from 1.4 to 10.

14. A process for producing the composite particles according to claim 1, the process comprising:
at least partially dissolving a polymer for the coating in a medium comprising a solvent which at least partially dissolves the polymer;
adding the core glass particles to the medium, before, during or after at least partially dissolving the polymer;
suspending the core glass particles in the medium; and then
precipitating the polymer from the at least partial solution onto the core glass particles to obtain the composite particles;
wherein a ratio of the $d_{50}$ median diameter of the composite particles to the $d_{50}$ median diameter of the core glass particles is from 1.01 to 5.0.

15. The process according to claim 14, wherein a density of the core particles is greater or not more than 20% smaller than the density of the solvent used for the precipitation of the polymer.

16. The process according to claim 14, wherein the solvent for the polymer is ethanol and a density of the core particles is greater or not more than 20% smaller than the density of ethanol.

17. A process for producing a moulded article, the process comprising:
applying a layer of the composite powder according to claim 1;
selectively melting at least one region of the layer by introduction of electromagnetic energy;
allowing the melted region to solidify;
applying another layer of composite powder and repeating the melting and solidification to perform a layer-by-layer process in which a molding having a structure according to the selective treatment is obtained;
wherein the melting selectivity is achieved by applying susceptors, inhibitors, or absorbers to each applied layer or by applying a mask to the applied layer.

18. A moulded article obtained according to the process of claim 17.

* * * * *